United States Patent [19]

Jackson et al.

[11] Patent Number: 4,858,011

[45] Date of Patent: Aug. 15, 1989

[54] VIDEO SWITCHER SYSTEM WITH MODULAR ARCHITECTURE

[76] Inventors: Richard A. Jackson, 10959 Genasci Rd., Nevada City, Calif. 95959; Peter D. Symes, 195 Ball Rd., Grass Valley, Calif. 95945; Richard S. Bannister, 251 Lawrence Way, Grass Valley, Calif. 95945; Thomas A. Grancey, 207 Upper Circle Dr., Grass Valley, Calif. 95945; Richard A. Frasier, 518 Walsh St., Grass Valley, Calif. 95945; John Abt, 13284 Red Dog Rd., Nevada City, Calif. 95959; Ronnie D. Barnett, 11971 Banner Mt. Trail, Nevada City, Calif. 95959; James E. Blecksmith, 12896 Quaker Hill Crossroad, Nevada City, Calif. 95959; Kevin D. Windrem, 157 Alta Sierra Dr., Grass Valley, Calif. 95945; Neil R. Olmstead, 13641 Tranquillity La., Nevada City, Calif. 95959

[21] Appl. No.: 177,212

[22] Filed: Apr. 4, 1988

[51] Int. Cl.$^4$ ............................................. H04N 5/262
[52] U.S. Cl. ...................................... 358/181; 358/185
[58] Field of Search ........................... 358/181, 185, 86

[56] References Cited

U.S. PATENT DOCUMENTS

| | | | |
|---|---|---|---|
| 4,382,266 | 5/1983 | Panzer | 358/181 |
| 4,402,008 | 8/1983 | Teraslinna | 358/181 |
| 4,764,812 | 8/1988 | Hamley | 358/185 |

*Primary Examiner*—Tommy P. Chin

[57] ABSTRACT

Video signal processing apparatus comprises at least first and second source selectors each having a plurality of input terminals, for receiving a plurality of video signals respectively, and at least two output terminals. A set of video processors each have an input terminal and an output terminal. A processor selector is provided for connecting each source selector output terminal selectively to each video processor input terminal. First and second output devices each have a plurality of input terminals connected to the output terminals of the video processors respectively and also have an output terminal. Operator interfaces are connected to the processor selector for defining a first subset of video processors having their input terminals connected to the output terminals of the first source selector and a second subset of video processors having their input terminals connected to the output terminals of the second source selector. The operator interfaces are also connected to the first output device for selecting the output terminals of the first subset of video processors and to the second output device for selecting the output terminals of the second subset of video processors.

23 Claims, 4 Drawing Sheets

VIDEO SWITCHER SYSTEM WITH MODULAR ARCHITECTURE

BACKGROUND OF THE INVENTION

This invention relates to a video switcher system with modular architecture.

FIG. 1 illustrates a conventional video mixing system, or switcher, in simplified block form. The FIG. 1 switcher comprises a source selector 2 which receives multiple video input signals, e.g. from external video signal sources, and provides selected ones of these input signals to mix/effects amplifiers (M/Es) 4. Each M/E receives at least two video input signals and combines them under control of signals provided by an operator interface 6 to provide on output video signal. The output signal provided by any of the M/Es 4 can be re-entered into another M/E through re-entry terminals 8 of the source selector 2. The output signal of the FIG. 1 switcher is taken from a reduced function program/-preset M/E 10.

Conventional switchers are fixed in their architecture at the time of manufacture, and accordingly the number of source selector inputs, the number of M/Es and the type and capabilities of each M/E cannot be changed. Therefore, in order to upgrade the switcher capability of a television studio, it has previously been necessary to replace the entire swticher. A user with limited resources might not be able to afford to replace his switcher. A user with greater resources will generally buy a switcher whose capabilities are limited only by the maximum anticipated requirements over the lifetime of the studio in which it is installed, and therefore the switcher will be under utilized much of the time. Since the functional components of one switcher cannot be shared with another switcher, a production facility with two or more studios may find itself handling simultaneously one production that is too large for its largest switcher and another production that under utilizes the smallest available switcher.

SUMMARY OF THE INVENTION

A preferred video signal processing apparatus embodying the present invention in a first aspect comprises source selector means having a plurality of input terminals, for receiving a plurality of video signals respectively, and at least two output terminals. A set of video processors each have an input terminal and an output terminal, the output terminals of the source selector means being connected to respective video processor input terminals. Output router means have a plurality of input terminals connected to the output terminals of the video processors respectively and also have at least first and second output terminals. Control means are connected to the source selector means for selecting a first set of source selector output terminals, and thereby defining a first subset of video processors having input terminals connected to the first set of source selector output terminals, and also selecting a second set of source selector output terminals, and thereby defining a second subset of video processors having input terminals connected to the second set of source selector output terminals. The control means are also connected to the output router means for selecting at least one output terminal of the first subset of video processors and at least one output terminal of the second subset of video processors and connecting the selected terminals to the first and second output terminals respectively of the output router means.

A preferred video signal processing apparatus embodying the present invention in a second aspect comprises at least first and second source selectors each having a plurality of input terminals, for receiving a plurality of video signals respectively, and at least two output terminals. A set of video processors each have an input terminal and an output terminal. The apparatus further comprises a processor selector for connecting each source selector output terminal selectively to each video processor input terminal. First and second output devices each have a plurality of input terminals connected to the output terminals of the video processors respectively and also have an output terminal. Control means are connected to the processor selector for defining a first subset of video processors having their input terminals connected to the output terminals of the first source selector and a second subset of video processors having their input terminals connected to the output terminals of the second source selector. The control means are also connected to the first output device for selecting the output terminals of the first subset of video processors and to the second output device for selecting the output terminals of the second subset of video processors.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
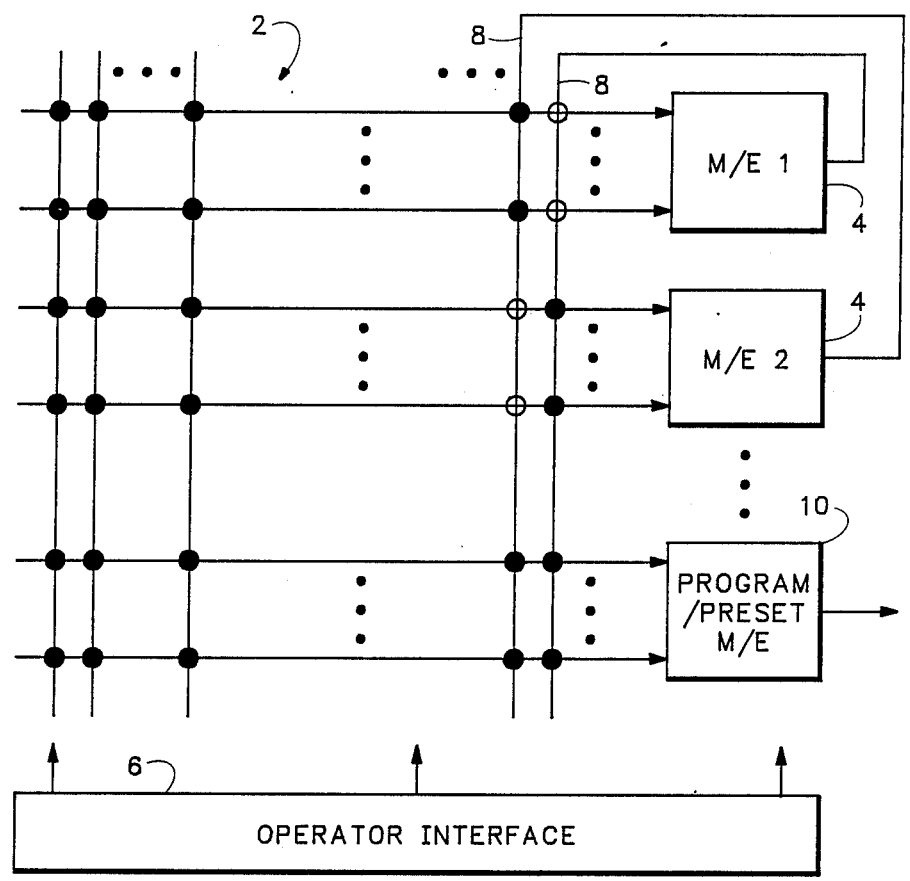
FIG. 1 is a block diagram of a conventional switcher.
Figure 2:
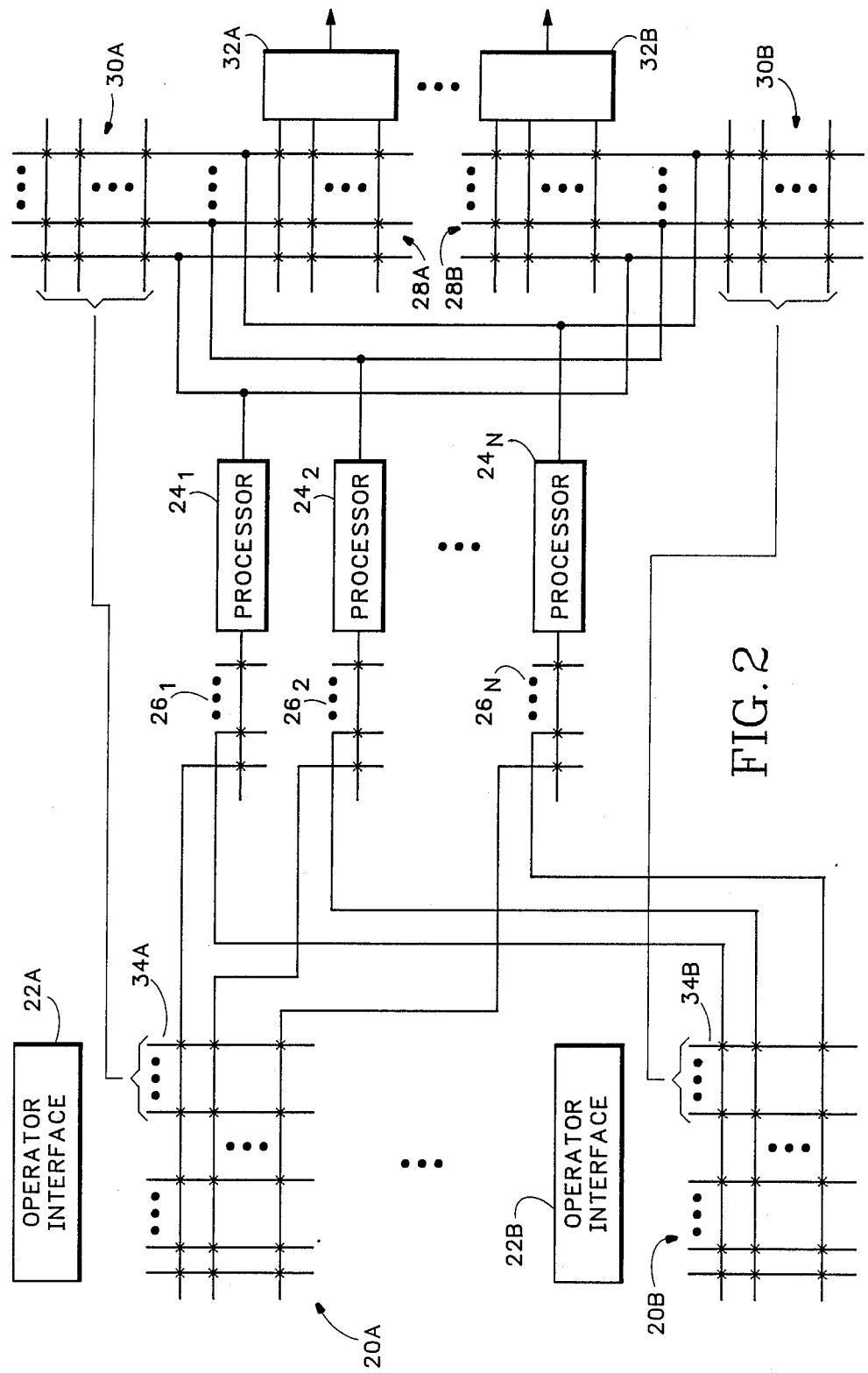
FIG. 2 is a block diagram of a switcher system embodying the present invention.

The switcher system illustrated in FIG. 2 is designed for use in common by multiple studios (Studio A, Studio B, etc.) in order to provide video mixing capabilities for all the studios. The switcher system comprises a source selector 20 and an operator interface 22 for each studio. Only the source selectors 20A and 20B and the operator interfaces 22A and 22B are shown in FIG. 2. The switcher system also comprises a pool of video processors $24_1, 24_2 \ldots 24_N$. Normally, the number of video processors would be at least twice the number of studios, but there is no fixed assignment of the video processors to the studios. Each source selector is similar to that which is used in a conventional switcher, except that it must be large enough to apply an input video signal to any of the video processors. Each studio has its own source selector because different studios generally have access to different respective sets of video sources.

Each video processor 24 is an M/E or a video processing channel, for example of the kind described in co-pending Patent Application Ser. No. 07/157,675 filed Feb. 19, 1988, the disclosure of which is hereby incorporated by reference herein. The co-pending application describes a switcher architecture in which the processing channel includes a circuit for limiting a video signal received by the channel in at least one of the amplitude domain and the spatial domain, in order to effect dissolves and wipes. The processors may be of different types, offering different features. Associated with each video processor 24 is an input selector 26. The input selector 26 has multiple input terminals connected to output terminals of the source selectors 20 respectively, and a single output terminal, and is operative to connect an output terminal of any selected source selector to the associated video processor.

The switcher system further comprises a primary output router 28, a secondary output router 30 and a video combiner 32 for each studio. Each output router 28 and 30 has N input terminals, connected to the output terminals of the processors respectively. The primary output routers 28 each have multiple output terminals connected to respective input terminals of the corresponding combiner 32 and delivers selected video signals to the combiner 32, whereas the outputs of the corresponding secondary router are looped back to re-entry input terminals 34 of the source selector 20.

The combiner 32 of a given studio may have n input terminals, where n is the number of processors required in order to achieve what is foreseen to be the most complex video effect that will be produced by the studio. The combiner 32 is a parallel combiner and may be of the kind described in the above-mentioned co-pending application. The combiner 32 receives n video signals from the primary output router 28, combines them in dependence on priority signals received from the operator interface 22, and provides a single output video signal.

Each operator interface 22 communicates with the associated primary router 28 so that the primary output router selects the outputs of the processors 24 that are connected to the associated source selector 20, and each operator interface 22 communicates with the associated combiner 32 for determining the manner in which the signals received from the output router are combined.

In use of the switcher system illustrated in FIG. 2, each studio operator determines how many and what kind of video processors are required by his production, and employs his operator interface 22 to request assignment of appropriate video processors from the central pool. This is accomplished for each required processor by generating a signal that specifies the type of processor and applying this signal to the video processors sequentially until the signal is accepted. The signal can only be accepted by a video processor that is not already assigned and is of the specified type. The video processor that accepted the signal is thereby assigned to the selecting studio. When a video processor has been assigned to a studio, it responds to operating commands received from the operator interface of that studio. An assigned video processor continues to receive commands from the operator interfaces of studios to which it is not assigned, but it does not respond to those commands.

When a video processor accepts assignment to a studio, the studio's operator interface provides a signal to the input selector associated with that video processor indicating that the input selector should accept the video signal provided by the source selector of the studio to which it is assigned. The operator interface also provides a signal to the primary and secondary output routers 28 and 30 indicating that the accepting video processor is assigned to that studio and that the output routers should select the output signal provided by the video processor. When the required set of processors has been assigned, the switcher is put into operation. If at any time during the production the operator requires an additional video processor, he can request assignment of a processor of the required type, in the manner previously described. Similarly, the operator may relinquish an assignment of one or more processors and thereby make them available for assignment to other studios. While a processor is assigned to a given studio, it functions as a fixed part of that studio and cannot be used by any other studio until its assignment is relinquished and it is reassigned.

Each primary router 28 is operated in parallel with its secondary router 30. By applying appropriate control signals to the combiner, and adjusting the primary output router, the operator is able to determine which processor output signal is to be used as a re-entry, and by the parallel operation of the primary and secondary routers this signal is made available at one of the re-entry input terminals of the source selector. The operator then uses the source selector to connect this re-entry input terminal to the processor that is to receive the re-entered video signal.

The output routers used in the FIG. 2 switcher may be cross-point switches, or they may alternatively be implemented by selectively operating mixers in the output stages of the processors.

Figure 3:
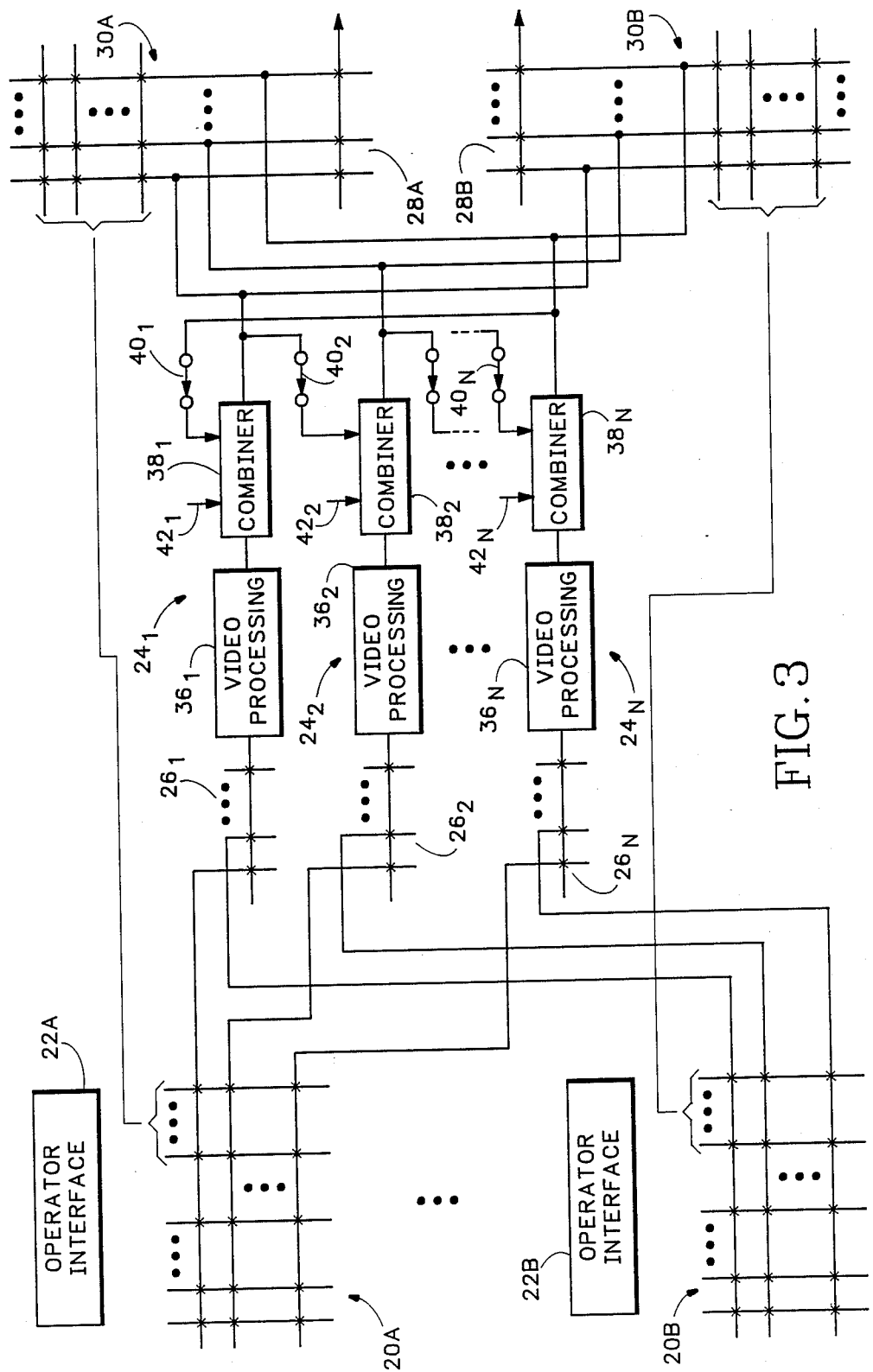
FIG. 3 is a block diagram of a modification of the switcher system shown in FIG. 2.

In the FIG. 3 modification of the FIG. 2 switcher system, the parallel combiners 32A, 32B etc. are not used. Instead, each video processor 24 includes not only a processing stage 36 but also a two-input combiner 38. The combiners 38 may be of the kind described in co-pending Patent Application Ser. No. 06/836,945, filed Mar. 6, 1986. The combiners $38_2 \ldots 38_N$ of the processors $24_2 \ldots 24_N$ each receive as one input the video signal generated by the processing stage $36_2 \ldots 36_N$ of that processor and has its other input connected to receive the output signal of the preceding processor $24_1 \ldots 24_{N-1}$. The second input of the combiner of the first processor $24_1$ is provided by the output of the last processor $24_N$. Each combiner has a terminal 42 at which it receives a priority signal from the operator interface to which the processor is assigned. The output signal of a combiner is a sum of the input signals received by the combiner, weighted in accordance with the priority signal, and constitutes the output signal of the processor. The output signals of the processors are applied to the output routers. Each primary router 28 selects only one processor; if a re-entry is desired, the secondary router selects a different processor from that selected by the primary router. Each combiner has a switch 40 in the signal path for receiving a video signal from another processor. When, for example, the operator of Studio A selects the processors $24_2$ through $24_J$ and the operator of Studio B selects processors $24_K$ through $24_N$ and $24_1$, the switches 40 of the processors $24_2$ and $24_K$ are opened (rendered non-conductive) and the output routers for 28A and 28B select the processors $24_J$ and $24_1$ respectively.

The FIG. 3 switcher system is less versatile than that shown in FIG. 2, because it is limited to the sets of processors assigned to the studios respectively being in continuous blocks and not being interleaved. For example, if the processors $24_1$ and $24_3$ were required by Studio A but processor $24_2$ was not required by Studio A, it would not be available for use by Studio B.

In the case of the FIG. 3 switcher system, re-entries are accomplished in the same fashion as described with reference to FIG. 2, using secondary output routers 30.

Figure 4:
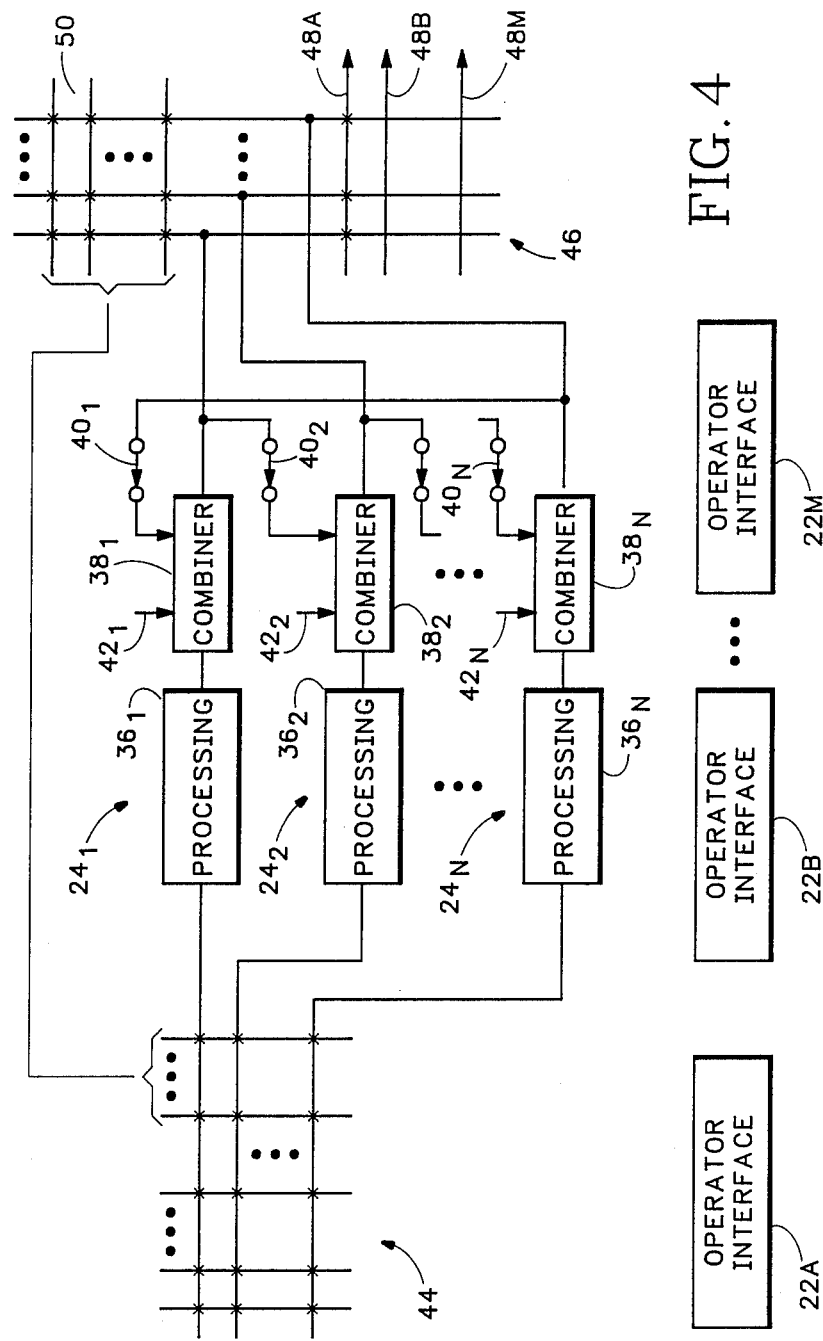
FIG. 4 is a block diagram of a modification of the switcher system shown in FIG. 3.

In the FIG. 4 switcher system, a single source selector 44 is used instead of the separate source selectors of the FIGS. 2 and 3 switcher systems. The source selector 44 has multiple input terminals connected to respective video sources and has multiple output terminals connected to the processors 24 respectively. Accordingly, any selected video source may be connected to any desired video processor. All video sources may be subject to selection by any of the operator interfaces, or alternatively each operator interface may be able to select only a subset of video sources. A single output router 46 has input terminals connected to the output terminals of the processors 24 respectively and has one program output terminal 48 assigned to each studio. The operator interfaces 22 act on the output router and determine which processors 24 have their output terminals connected to the terminals 48 respectively. In order to avoid the possibility of the operator of studio A, for example, attempting to cause the output router to connect the output terminal of a processor that is not assigned to studio A to the terminal 48A, the operator interfaces may be configured so that the interface of a given studio is able to select only the output terminal of one of the processors assigned to that signal for connection to the studio's program output terminal 48.

A secondary router 50 is operated in parallel with the router 46 for providing re-entries to the source selector 44.

It is not essential that a single output router be used in conjuction with a single source selector, as shown in FIG. 4, since multiple source selectors may be used in conjunction with a single output router or multiple output routers may be used in conjunction with a single source selector. Where a single output router is used, having a single program output terminal for each studio, the combining operation must take place upstream of the output router. However, where multiple output routers are used, the combining may take place either upstream of the routers, as in FIG. 3, or downstream, as in FIG. 2.

It will be appreciated that the present invention is not restricted to the particular embodiment that has been described and illustrated, and that variations may be made therein without departing from the scope of the invention as defined in the appended claims and equivalents thereof. For example, the invention is not limited to use of processing channels which operate on video signals in unary fashion. One or more of the processors might comprise an M/E which receives at least two video signals and operates on them in binary fashion. In this case, the input selector is capable of independently selecting at least two video signals for application to the M/E.

We claim:

1. A video switcher system comprising:
   at least first and second source selectors each having a plurality of input terminals, for connection to a plurality of video signal sources respectively, and at least two output terminals,
   a set of video processors each having at least one input terminal and an output terminal,
   switch means for connecting each source selector output terminal selectively to each video processor input terminal,
   at least first and second output devices each having a plurality of input terminals connected to the output terminals of the video processors respectively and also an output terminal, and
   control means connected to the switch means for defining a first subset of said video processors having their input terminals connected to the output terminals of the first source selector and a second subset of said video processors having their input terminals connected to the output terminals of the second source selector, said control means also being connected to the first output device for selecting at least one output terminal from the group consisting of output terminals of the first subset of said video processors and to the second output device for selecting at least one output terminal from the group consisting of output terminals of the second subset of said video processors.

2. A video switcher system according to claim 1, wherein each said video processor has a single input terminal for receiving a single input video signal, and includes a circuit for limiting the video signal received by the video processor in at least one of the amplitude domain and the spatial domain without transforming the video signal in the spatial domain.

3. A video switcher system according to claim 1, wherein the first and second output devices each comprise video router means and a combiner, the control means being operative to cause the video router means of the first output device to select the output terminals of the first subset of video processors and to cause the video router means of the second output device to select the output terminals of the second subset of video processors.

4. A video switcher system according to claim 3, comprising N of said video processors and wherein the combiner of the first output device has n input terminals, where N and n are positive integers greater than two and N is at least as great as n, and the video router means of the first output device comprise a primary router having N input terminals connected to the output terminals of the N video processors respectively and n output terminals connected to respective input terminals of the combiner of the first output device.

5. A video switcher system according to claim 4, wherein the video router means of the first output device further comprise a secondary router having N input terminals connected to the output terminals of the N video processors respectively, and at least one output terminal, and at least one input terminal of the first source selector is a re-entry input terminal connected to the output terminal of the secondary router.

6. A video switcher system according to claim 1, wherein each of said video processor comprises a processing stage and a two-input combiner having a first input terminal connected to receive a video signal generated in the processing stage, a second input terminal, and an output terminal which constitutes the output terminal of the video processor and is connected to the second input terminal of the combiner of another one of said video processor.

7. A video switcher system according to claim 6, comprising N of said video processors, where N is a positive integer greater than two, and the output terminal of the combiner of the ith video processor, where i is less than N, is connected to the second input terminal of the combiner of the (i+1)th video processor.

8. A video switcher system according to claim 7, wherein the output terminal of the combiner of the Nth video processor is connected to the second input terminal of the combiner of the first video processor.

9. A video switcher system according to claim 6, wherein the first and second output devices comprise first and second video router means respectively, the control means being operative to cause the first video router means to select the output terminal of the combiner of a video processor in the first subset and to cause the second video router means to select the output terminal of the combiner of a video processor in the second subset.

10. A video switcher system comprising:
source selector means having a plurality of input terminals, for connection to a plurality of video signal sources respectively, and a plurality of output terminals,
a set of video processors each having at least one input terminal and an output terminal, the output terminals of the source selector means being connected to respective video processor input terminals,
output router means having a plurality of input terminals connected to the output terminals of the video processors respectively and also having at least first and second output terminals, and
control means connected to the source selector means for selecting a first set of said output terminals thereof, and thereby defining a first subset of said video processors having input terminals connected to said first set of output terminals, and also selecting a second set of said output terminals of the source selector means, and thereby defining a second subset of said video processors having input terminals connected to said second set of output terminals, said control means also being connected to the output router means for selecting at least a first terminal from a first group consisting of output terminals of the first subset of video processors and causing the output router means to connect the selected first terminal to the first output terminal of the output router means, and for selecting at least a second terminal from a second group consisting of output terminals of the second subset of video processors and causing the output router means to connect the selected second terminal to the second output terminal of the output router means.

11. A video switcher system according to claim 10 wherein each of said video processors has a single input terminal for receiving a single input video signal, and includes a circuit for limiting the video signal received by the processor in at least one of the amplitude domain and the spatial domain without transforming the video signal in the spatial domain.

12. A video switcher system according to claim 10, wherein the output router means comprise first and second video router means, the control means being operative to cause the first video router means to select the output terminals of the first subset of video processors and to cause the second video router means to select the output terminals of the second subset of video processors.

13. A video switcher system according to claim 12, comprising N of said video processors, where N is a positive integer greater than two, and wherein the first video router means comprise a primary router having N input terminals connected to the output terminals of the N video processors respectively and an output terminal.

14. A video system according to claim 13, wherein the first video router means further comprise a secondary router having N input terminals connected to the output terminals of the N video processors respectively, and at least one output terminal, and at least one input terminal of the source selector means is a re-entry input terminal connected to the output terminal of the secondary router.

15. A video switcher system according to claim 10, wherein each of said video processors comprises a processing stage and a two-input combiner having a first input terminal connected to receive a video signal generated in the processing stage, a second input terminal, and an output terminal which constitutes the output terminal of the video processor and is connected to the second input terminal of the combiner of another one of said video processor.

16. A video switcher system according to claim 15, comprising N of said video processors, where N is a positive integer greater than two, and the output terminal of the combiner of the ith video processor, where i is less than N, is connected to the second input terminal of the combiner of the (i+1)th video processor.

17. A video switcher system according to claim 16, wherein the combiner of the the Nth video processor is connected to the second input terminal of the combiner of the first video processor.

18. A video switcher system according to claim 15, wherein the output router means comprise first and second video router means respectively, the control means being operative to cause the first video router means to select the output terminal of the combiner of a video processor in the first subset and to cause the second video router means to select the output terminal of the combiner of a video processor in the second subset.

19. A video switcher system according to claim 10, wherein the output router means comprise at least first and second output devices each having a plurality of input terminals connected to the output terminals of the video processors respectively and also having an output terminal, the output terminals of the output devices constituting the output terminals of the output router means.

20. A video switcher system according to claim 19, wherein the first and second output devices each comprise video router means and a combiner, the control means being operative to cause the video router means of the first output device to select the output terminals of the first subset of video processors and to cause the video router means of the second output device to select the output terminals of the second subset of video processors.

21. A video switcher system according to claim 20, comprising N of said video processors and wherein the combiner of the first output device has n input terminals, where N and n are positive integers greater than two and N is at least as great as n, and the video router means of the first output device comprise a primary router having N input terminals connected to the output terminals of the N video processors respectively and n output terminals connected to respective input terminals of the combiner of the first output device.

22. A video switcher system according to claim 21, wherein the video router means of the first output device further comprise a secondary router having N input terminals connected to the output terminals of the N video processors respectively, and at least one output terminal, and at least one input terminal of the source selector means is a re-entry terminal connected to the output terminal of the secondary router.

23. A video switcher system according to claim 10, comprising N of said video processors, where N is a positive integer greater than two, and wherein the output router means comprise a primary router having N input terminals connected to the output terminals of the N video processors respectively and at least first and second output terminals, constituting the output terminals of the output router means, and wherein the output router means further comprise a secondary router having N input terminals connected to the output terminals of the N video processors respectively, and at least one output terminal, and at least one input terminal of the source selector means is a re-entry input terminal connected to the output terminal of the secondary router.

* * * * *